US011729723B2

(12) United States Patent
Yang et al.

(10) Patent No.: US 11,729,723 B2
(45) Date of Patent: Aug. 15, 2023

(54) POWER CONTROL INDICATION FOR MULTIPLE SERVICES

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 16/951,961

(22) Filed: Nov. 18, 2020

(65) Prior Publication Data

US 2021/0160784 A1    May 27, 2021

Related U.S. Application Data

(60) Provisional application No. 62/938,943, filed on Nov. 21, 2019.

(51) Int. Cl.
*H04W 52/10* (2009.01)
*H04W 52/14* (2009.01)
*H04W 72/23* (2023.01)

(52) U.S. Cl.
CPC ......... *H04W 52/10* (2013.01); *H04W 52/146* (2013.01); *H04W 72/23* (2023.01)

(58) Field of Classification Search
CPC ... H04W 52/10; H04W 52/146; H04W 52/26; H04W 52/36; H04W 72/12; H04W 72/1289; H04W 52/04; H04W 52/14
See application file for complete search history.

(56) References Cited

U.S. PATENT DOCUMENTS 10,470,136 B1 * 11/2019 Ghosh ................. H04W 56/001
2004/0147274 A1 * 7/2004 Khawand .............. H04W 52/50
                                                                  455/450

(Continued)

FOREIGN PATENT DOCUMENTS

WO    WO-2018137707 A1    8/2018
WO    WO-2019214443 A1    11/2019

(Continued)

OTHER PUBLICATIONS

International Search Report and Written Opinion—PCT/US2020/061190—ISA/EPO—dated Feb. 16, 2021.

*Primary Examiner* — Nathan S Taylor
(74) *Attorney, Agent, or Firm* — Harrity & Harrity, LLP

(57) ABSTRACT

This disclosure provides systems, methods and apparatus for power control indication for multiple services. A base station may transmit scheduling information to a UE indicating first, second, and third open-loop power levels associated with uplink transmissions on a first wireless channel. The base station may select one of the first, second, or third open-loop power levels to be used for a first uplink transmission based on a type of service associated with the first uplink transmission. For example, the first open-loop power level may be associated with enhanced mobile broadband (eMBB) services, the second open-loop power level may be a base open-loop power level associated with ultra-reliable low-latency communication (URLLC) services, and the third open-loop power level may be a boosted open-loop power level associated with URLLC services. The base station may further transmit open loop power control information to the UE indicating the selected open-loop power level.

44 Claims, 12 Drawing Sheets

(56) References Cited

U.S. PATENT DOCUMENTS

| | | | | |
|---|---|---|---|---|
| 2017/0013648 A1* | 1/2017 | Jung | | H04W 76/10 |
| 2018/0092104 A1* | 3/2018 | Sheng | | H04L 5/0064 |
| 2019/0014564 A1* | 1/2019 | Lee | | H04W 72/121 |
| 2019/0159136 A1* | 5/2019 | MolavianJazi | | H04L 5/001 |
| 2019/0215781 A1* | 7/2019 | Jeon | | H04W 24/10 |
| 2019/0327686 A1 | 10/2019 | Zhang et al. | | |
| 2019/0349866 A1* | 11/2019 | Lin | | H04W 52/242 |
| 2019/0364511 A1* | 11/2019 | Chen | | H04W 52/242 |
| 2019/0394732 A1 | 12/2019 | Loehr et al. | | |
| 2020/0119799 A1* | 4/2020 | Jung | | H04W 52/228 |
| 2020/0120713 A1* | 4/2020 | Yerramalli | | H04W 24/10 |
| 2020/0137695 A1* | 4/2020 | Papasakellariou | | H04W 52/50 |
| 2020/0305183 A1 | 9/2020 | Papasakellariou | | |
| 2020/0314860 A1* | 10/2020 | Zhou | | H04W 72/1289 |
| 2020/0383061 A1* | 12/2020 | Yang | | H04W 72/14 |
| 2021/0051594 A1* | 2/2021 | Chae | | H04L 1/0026 |
| 2021/0410084 A1* | 12/2021 | Li | | H04W 52/265 |
| 2022/0191799 A1* | 6/2022 | Xu | | H04W 52/10 |
| 2022/0217750 A1* | 7/2022 | Liu | | H04W 72/1242 |
| 2022/0232489 A1* | 7/2022 | Zhang | | H04W 52/365 |

FOREIGN PATENT DOCUMENTS

| | | | | |
|---|---|---|---|---|
| WO | WO-2019216073 A1 | | 11/2019 | |
| WO | WO-2019243081 A1 | | 12/2019 | |
| WO | WO-2020092985 A1 | | 5/2020 | |
| WO | WO-2020247523 A1 | | 12/2020 | |
| WO | WO-2021056528 A1 * | | 4/2021 | H04L 5/003 |

* cited by examiner

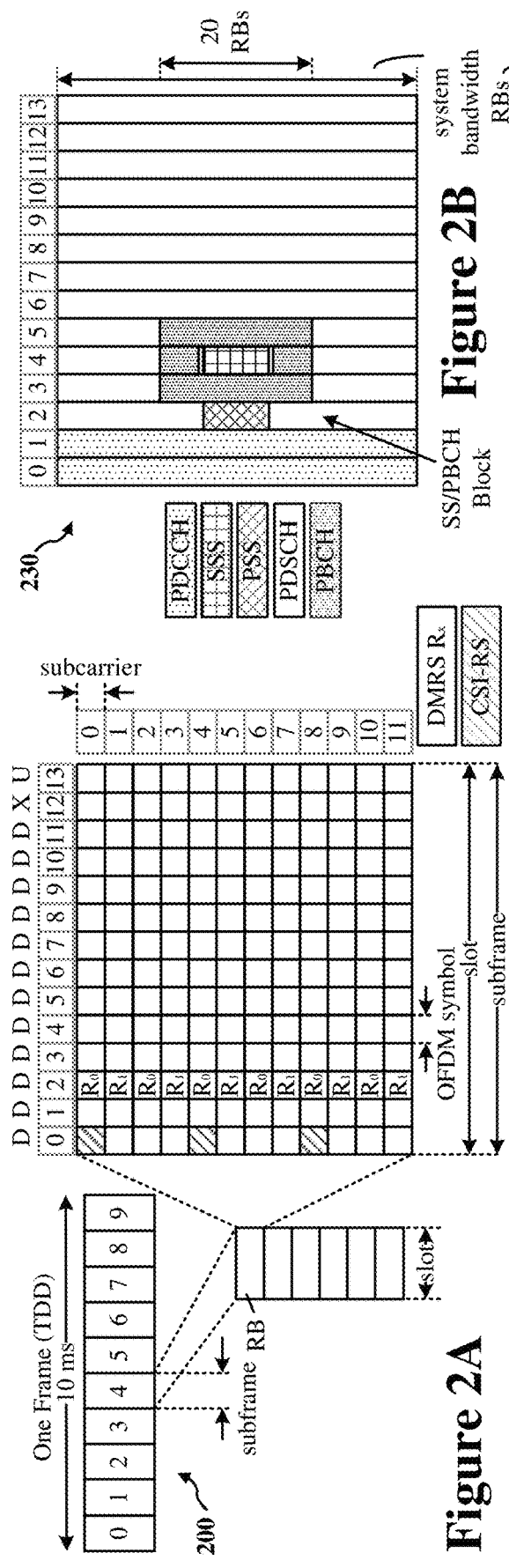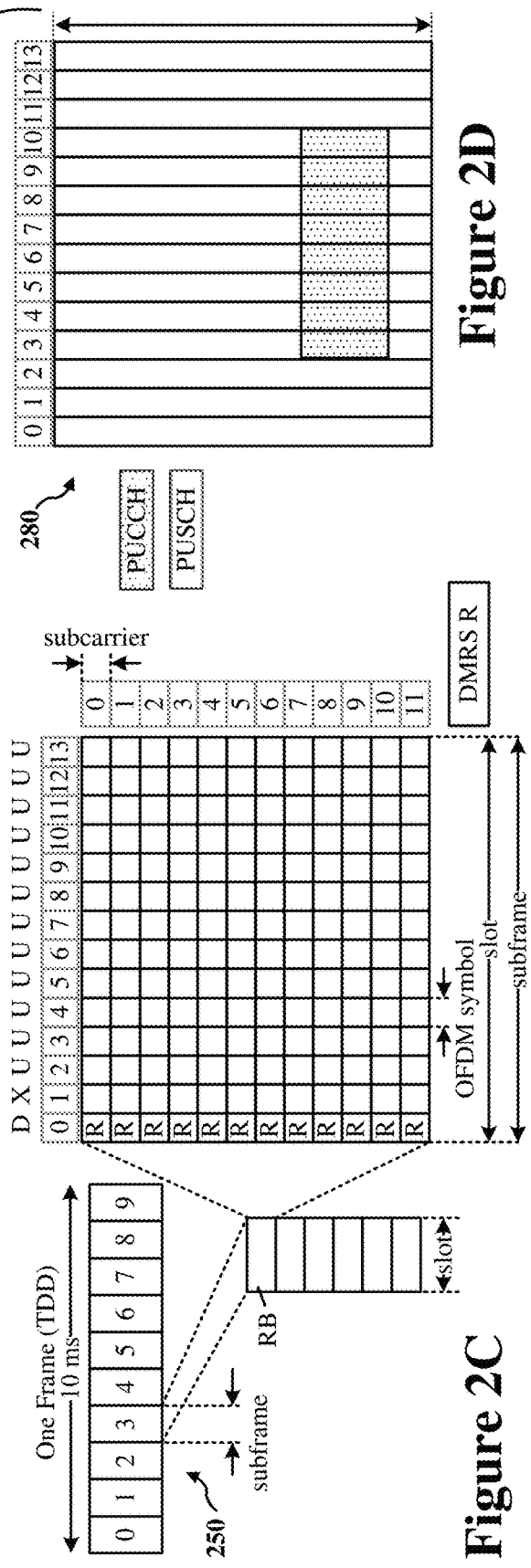

800

```
┌─────────────────────────────────────────────────────────────┐
│   Transmitting, to a first wireless device, scheduling       │
│   information indicating first, second, and third open-loop  │
│   power levels associated with uplink transmissions on a     │
│   first wireless channel. (802)                              │
└─────────────────────────────────────────────────────────────┘
                              │
                              ▼
┌─────────────────────────────────────────────────────────────┐
│   Selecting one of the first, second, or third open-loop     │
│   power levels to be used for a first uplink transmission by │
│   the first wireless device based at least in part on a type │
│   of service associated with the first uplink transmission.  │
│   (804)                                                      │
└─────────────────────────────────────────────────────────────┘
                              │
                              ▼
┌─────────────────────────────────────────────────────────────┐
│   Transmitting, to the first wireless device, open-loop      │
│   power control information indicating the selected          │
│   open-loop power level. (806)                               │
└─────────────────────────────────────────────────────────────┘
                              │
                              ▼
┌─────────────────────────────────────────────────────────────┐
│   Receiving the first uplink transmission on the first       │
│   wireless channel based on the selected open-loop power     │
│   level. (808)                                               │
└─────────────────────────────────────────────────────────────┘
```

Figure 8A

POWER CONTROL INDICATION FOR MULTIPLE SERVICES

CROSS-REFERENCE TO RELATED APPLICATIONS

This patent application claims priority to U.S. Provisional Patent Application No. 62/938,943 entitled "POWER CONTROL INDICATION FOR MULTIPLE SERVICES" and filed on Nov. 21, 2019, which is assigned to the assignee hereof. The disclosure of the prior spplication is considered part of and are incorporated by reference in this patent application.

TECHNICAL FIELD

This disclosure relates generally to wireless communication and, more specifically, to power control indications for multiple services.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

In some wireless communications systems, multiple services may be supported that require different reliability and latency qualities. For example, eMBB services may support a first set of reliability and latency standards, while URLLC services may support a second set of standards with higher reliability and lower latency than the eMBB services. In order to more efficiently utilize a spectrum of time-frequency resources, UEs configured with different services may be dynamically multiplexed on the same time-frequency resources. As such, interference or conflicts may occur between the transmission on the same resources. Efficient techniques are desired for accommodating transmissions on the same resources to ensure both are transmitted and received successfully.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include transmitting, to a first wireless device, scheduling information indicating first, second, and third open-loop power levels associated with uplink transmissions on a first wireless channel; selecting one of the first, second, or third open-loop power levels to be used for a first uplink transmission by the first wireless device based at least in part on a type of service associated with the first uplink transmission; transmitting, to the first wireless device, open-loop power control information indicating the selected open-loop power level; and receiving the first uplink transmission on the first wireless channel based on the selected open-loop power level. The selected open-loop power level represents a power of the first uplink transmission to be received by the wireless communication device. In some implementations, the first wireless channel is a physical uplink shared channel (PUSCH).

In some implementations, the type of service is an enhanced mobile broadband (eMBB) service type or an ultra-reliable low-latency communication (URLLC) service type. In some implementations, the first open-loop power level is associated with the eMBB service type, the second open-loop power level is a base open-loop power level associated with the URLLC service type, and the third open-loop power level is a boosted open-loop power level associated with the URLLC service type. In some implementations, the second open-loop power level is higher than the first open-loop power level, and the third open-loop power level is higher than the second open-loop power level.

In some implementations, the selecting of one of the first, second, or third open-loop power levels includes determining that the first uplink transmission is associated with the URLLC service type; determining whether the first uplink transmission is scheduled to overlap with uplink transmissions from other wireless devices on the first wireless channel; and selecting the second open-loop power level or the third open-loop power level based on whether the first uplink transmission is scheduled to overlap with uplink transmissions from other wireless devices. In some aspects, the second open-loop power level is selected responsive to determining that no uplink transmissions by other wireless devices are scheduled to overlap with the first uplink transmission. In some other aspects, the third open-loop power level is selected responsive to determining that a second uplink transmission by a second wireless device is scheduled to overlap with the first uplink transmission. In some implementations, the second uplink transmission is associated with the eMBB service type.

In some implementations, the scheduling information is transmitted in a radio resource control (RRC) message carrying a p0-AlphaSets parameter and a P0-PUSCH-Set parameter. In some implementations, the first open-loop power level is indicated by a value of the p0-AlphaSets parameter, the second open-loop power level is indicated by a first value of the P0-PUSCH-Set parameter, and the third open-loop power level is indicated by a second value of the P0-PUSCH-Set parameter.

In some implementations, the open loop power control information is transmitted in a downlink control information (DCI) message including at least one of a priority field or an open loop power control field. In some implementations, the open loop power control information is indicated by a combination of bits in the priority field or the open loop power control field.

Another innovative aspect of the subject matter described in this disclosure can be implemented in a wireless communication device. In some implementations, the wireless communication device may include one or more processors and a memory coupled to the one or more processors and including instructions that, when executed by the one or more processors, cause the wireless communication device to transmit, to a first wireless device, scheduling information indicating first, second, and third open-loop power levels associated with uplink transmissions on a first wireless channel; select one of the first, second, or third open-loop power levels to be used for a first uplink transmission by the first wireless device based at least in part on a type of service associated with the first uplink transmission; transmit, to the first wireless device, open-loop power control information indicating the selected open-loop power level; and receive the first uplink transmission on the first wireless channel based on the selected open-loop power level.

Another innovative aspect of the subject matter described in this disclosure can be implemented as a method of wireless communication. The method may be performed by a wireless communication device, and may include receiving scheduling information indicating first, second, and third open-loop power levels associated with uplink transmissions on a first wireless channel; receiving open loop power control information indicating one of the first, second, or third open-loop power levels; determining a transmit power for a first uplink transmission based at least in part on the indicated open-loop power level; and performing the first uplink transmission, on the first wireless channel, at the determined transmit power. In some implementations, the first wireless channel is a PUSCH.

In some implementations, the first open-loop power level is associated with an eMBB service type, the second open-loop power level is a base open-loop power level associated with a URLLC service type, and the third open-loop power level is a boosted open-loop power level associated with the URLLC service type. In some implementations, the second open-loop power level is higher than the first open-loop power level, and the third open-loop power level is higher than the second open-loop power level.

In some implementations, the scheduling information is received in an RRC message carrying a p0-AlphaSets parameter and a P0-PUSCH-Set parameter. In some implementations, the first open-loop power level is indicated by a value of the p0-AlphaSets parameter, the second open-loop power level is indicated by a first value of the P0-PUSCH-Set parameter, and the third open-loop power level is indicated by a second value of the P0-PUSCH-Set parameter.

In some implementations, the open loop power control information is received in a DCI message including at least one of a priority field or an open loop power control field. In some implementations, the open loop power control information is indicated by a combination of bits in the priority field or the open loop power control field.

Another innovative aspect of the subject matter described in this disclosure can be implemented in a wireless communication device. In some implementations, the wireless communication device may include one or more processors and a memory coupled to the one or more processors and including instructions that, when executed by the one or more processors, cause the wireless communication device to receive scheduling information indicating first, second, and third open-loop power levels associated with uplink transmissions on a first wireless channel; receive open loop power control information indicating one of the first, second, or third open-loop power levels; determine a transmit power for a first uplink transmission based at least in part on the indicated open-loop power level; and perform the first uplink transmission, on the first wireless channel, at the determined transmit power.

BRIEF DESCRIPTION OF THE DRAWINGS

FIGS. 2A, 2B, 2C, and 2D show examples of a first 5G/NR frame, downlink (DL) channels within a 5G/NR slot, a second 5G/NR frame, and uplink (UL) channels within a 5G/NR slot, respectively.

FIG. 8A shows a flowchart illustrating an example process for wireless communication that supports power control indication for multiple services according to some implementations.

DETAILED DESCRIPTION

Figure 1:
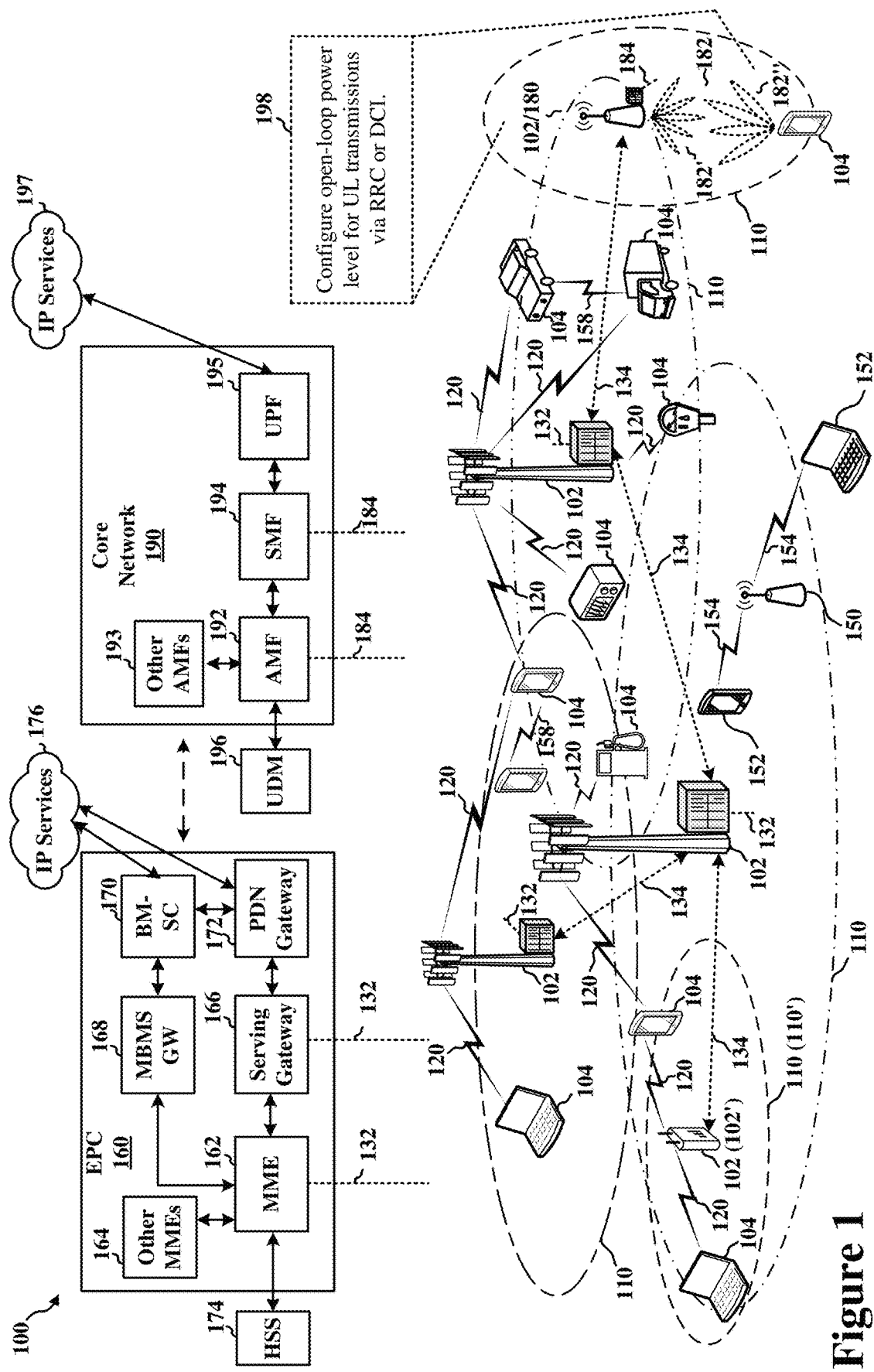
FIG. 1 shows a diagram of an example wireless communications system and an access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

In some wireless communications systems, multiple services may be supported that require different reliability and latency qualities. For example, enhanced mobile broadband (eMBB) services may support a first set of reliability and latency standards, while ultra-reliable low latency communications (URLLC) services may support a second set of standards with higher reliability and lower latency than the eMBB services. In order to more efficiently utilize a spectrum of time-frequency resources, UEs configured with different services may be dynamically multiplexed (overlap) on the same time-frequency resources. As such, interference or conflicts may occur between the transmission on the same resources.

Various implementations relate generally to transmit power control in wireless communications. Some implementations more specifically relate to using existing signaling techniques to indicate multiple power levels related to different services. In some implementations, an open loop power parameter may be indicated by a base station to a UE using radio resource control (RRC) signaling. In some aspects, an open-loop power level associated with eMBB services may be indicated in an existing RRC parameter (such as p0-AlphaSets, as defined by Rel-15 of the 3GPP standards). In some other aspects, one or more open-loop power levels associated with URLLC services may be indicated in a new RRC parameter (such as P0-PUSCH-Set). In some other implementations, an open loop power parameter may be indicated by a base station to a UE using one or more downlink control information (DCI) messages. For example, the open loop power parameter in the DCI message may indicate a selection of one of the open-loop power levels indicated in the RRC message. In some aspects, each DCI message may include at least one of a priority field or an open-loop power control (OLPC) field. The open-loop power levels associated with eMBB or URLLC services may be indicated based on a combination of bits in the priority field or the OLPC field.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180, may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the base station 102/180 may indicate an open-loop power level to be used for UL transmissions by one or more UEs 104 via RRC signaling or DCI messages (198). In some implementations, an open-loop power level associated with eMBB services may be indicated in an existing RRC parameter (such as p0-AlphaSets, as defined by Rel-15 of the 3GPP standards). In some other implementations, one or more open-loop power levels associated with URLLC services may be indicated in a new RRC parameter (such as P0-PUSCH-Set). Still further, in some implementations, a selection of one of the open-loop power levels associated with eMBB or URLLC services may be indicated based on a combination of bits in the priority field or the OLPC field of one or more DCI messages.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. The 5G/NR frame structure may be FDD in which, for a particular set of subcarriers (carrier system bandwidth), slots within the set of subcarriers are dedicated for either DL or UL In other cases, the 5G/NR frame structure may be TDD in which, for a particular set of subcarriers (carrier system bandwidth), slots within the set of subcarriers are dedicated for both DL and UL. In the examples shown in FIGS. 2A and 2C, the 5G/NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G/NR frame structure that is FDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE. In some configurations, one or more REs may carry a demodulation RS (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
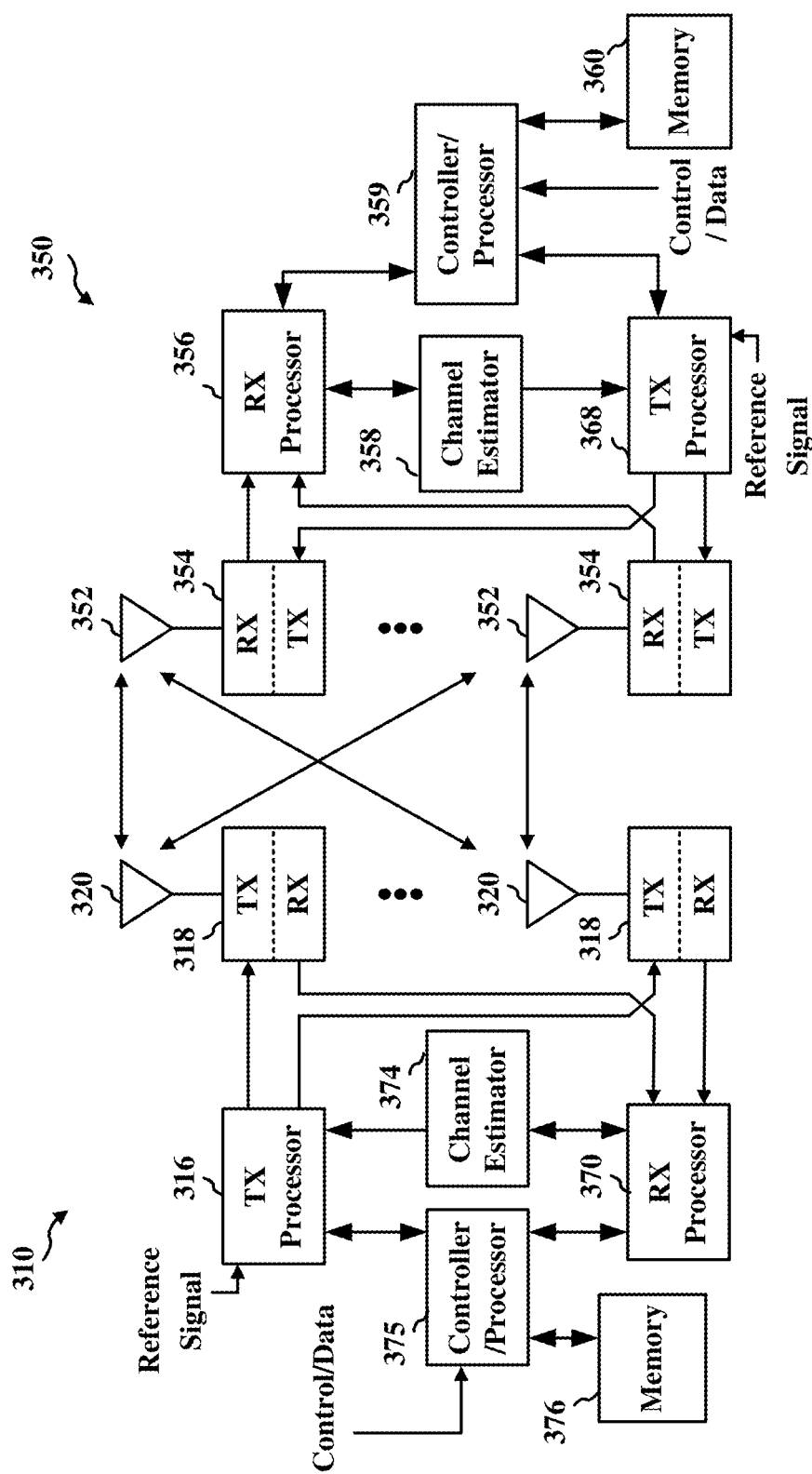
FIG. 3 shows a block diagram of an example base station and user equipment (UE) in an access network.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. Information to be wirelessly communicated (such as for LTE or NR based communications) is encoded and mapped, at the PHY layer, to one or more wireless channels for transmission.

In some wireless communications systems, multiple services may be supported that require different reliability and latency qualities. For example, eMBB services may support a first set of reliability and latency standards, while URLLC services may support a second set of standards with higher reliability and lower latency than the eMBB services. In order to more efficiently utilize a spectrum of time-frequency resources, UEs configured with different services may be dynamically multiplexed on the same time-frequency resources. For example, if urgent uplink URLLC traffic arrives, a base station may need to schedule the URLLC traffic on time-frequency resources partially allocated to one or more eMBB UEs to ensure the URLLC traffic is successfully transmitted by the URLLC UEs. In some aspects, the base station may boost the power of the URLLC traffic to ensure that it is transmitted and received on the overlapping time-frequency resources. For example, the base station may transmit a transmit power control (TPC) command to indicate a power adjustment for all transmissions of one or more UEs.

The TPC for indicating a power adjustment for transmissions by one or more UEs may be part of an enhanced power control (or power boosting) technique employed by the base station and the one or more UEs. For example, based on the enhanced power control, the one or more UEs may boost their respective transmit power for transmitting URLLC traffic to reduce the chances of interference from eMBB traffic, thus ensuring that the URLLC traffic is successfully transmitted to the base station. In some implementations, the enhanced power control may include the base station dynamically indicating an open loop power control parameter for adjusting the transmit power. In some aspects, the open loop power control parameter may indicate at least one of an open-loop power level (or base power level) associated with eMBB services ($P_0^{EMBB}$), a base open-loop power level associated with URLLC services ($P_0^{URLLC}$), or a boosted open-loop power level associated with URLLC services ($P_0^{URLLC,boost}$).

Since URLLC traffic requires higher reliability than eMBB traffic, $P_0^{URLLC}$ may be higher than $P_0^{EMBB}$ to achieve the greater reliability. Further $P_0^{URLLC,boost}$ may be even higher than $P_0^{URLLC}$. $P_0^{URLLC,boost}$ may be used when the URLLC transmission is scheduled on a resource that overlaps or partially overlaps with another UE's eMBB transmission. In such instances, the URLLC UE may need to transmit at a higher power $P_0^{URLLC,boost}$ in order to mitigate the interference caused by the concurrent eMBB transmission.

The total transmit power for an uplink message (transmitted on a PUSCH) may be determined according to Equation 1.

$$P_{PUSCH} = \min\{P_{C,max}, P_0(j) + \alpha(j) \cdot PL(q) + 10 \log_{10}(2^\mu M_{RB}) + \Delta_{TF} + f(l)\} \qquad (1)$$

where $P_{c,max}$ represents a maximum transmit power for a UE configured to transmit the uplink message. $P_0(j)$ and $\alpha(j)$ may represent open-loop power control parameters, where $P_0(j) = P_{0,UE}(j) + P_{0,nominal}(j)$ and indicates a desired (or required) receive power at the base station for the uplink message and $\alpha(j) \leq 1$ and indicates a fractional path-loss compensation factor. j may represent an open-loop power control index, where j=0 for a msg3 transmission (as part of a four-step random access channel (RACH) procedure), j=1 for configured grant transmissions, and j=2 . . . (j−1) for dynamically scheduled PUSCH transmissions. In some instances, an SRS resource indicator (SRI) may be used to further select between j=2 . . . (j−1). Additionally, $P_{0,UE}(j)$ and a may be dynamically changed. PL(q) may represent a path-loss measured by downlink reference signals, and q may represent a path-loss index. $M_{RB}$ may represent a number of RBs for the PUSCH transmission, and μ may represent a sub-carrier spacing (SCS) for the PUSCH transmission. $\Delta_{TF}$ may represent a configured value from the base station for a maximum power reduction (MPR) for the PUSCH transmission. f(l) may represent a closed-loop power control parameter signaled by the base station.

The open-loop power level $P_0(j)$ may be indicated by the base station via one or more signaling techniques. For a dynamic PUSCH, the base station may dynamically signal the open-loop power level $P_0(j)$ via SRI. For a configured grant PUSCH, the base station may signal the open-loop power level $P_0(j)$ via RRC signaling. As described above, the open-loop power level $P_0(j)$ may be one of three possible values $P_0^{EMBB}$, $P_0^{URLLC}$, or $P_0^{URLLC,boost}$. Thus, there is a need to use existing signaling techniques (such as RRC and DCI) to indicate the three open-loop power levels, including which of the three open-loop power levels is to be implemented by a particular UE for a given transmission.

Various implementations relate generally to transmit power control in wireless communications. Some implementations more specifically relate to using existing signaling techniques to indicate multiple power levels related to different services. In some implementations, an open loop power parameter may be indicated by a base station to a UE using RRC signaling. In some aspects, an open-loop power level associated with eMBB services may be indicated in an existing RRC parameter (such as p0-AlphaSets, as defined by Rel-15 of the 3GPP standards). In some other aspects, one or more open-loop power levels associated with URLLC services may be indicated in a new RRC parameter (such as P0-PUSCH-Set). For example, the base open-loop power level associated with URLLC services ($P_0^{URLLC}$) may be indicated by a first value of the P0-PUSCH-Set parameter and the boosted open-loop power level associated with URLLC services ($P_0^{,boost}$) may be indicated by a second value of the P0-PUSCH-Set parameter.

In some other implementations, an open loop power parameter may be indicated by a base station to a UE using one or more DCI messages. For example, the open loop power parameter in the DCI message may indicate a selection of one of the open-loop power levels indicated in the RRC message. In some aspects, each DCI message may include at least one of a priority field or an open-loop power control (OLPC) field. The open-loop power levels associated with eMBB or URLLC services may be indicated based on a combination of bits in the priority field or the OLPC field. For example, a first bit pattern may represent the open-loop power level associated with eMBB services ($P_0^{EMBB}$), a second bit pattern may represent the base open-loop power level associated with URLLC services ($P_0^{URLLC}$) and a third bit pattern may represent the boosted open-loop power level associated with URLLC services ($P_0^{URLLC,boost}$).

Figure 4:
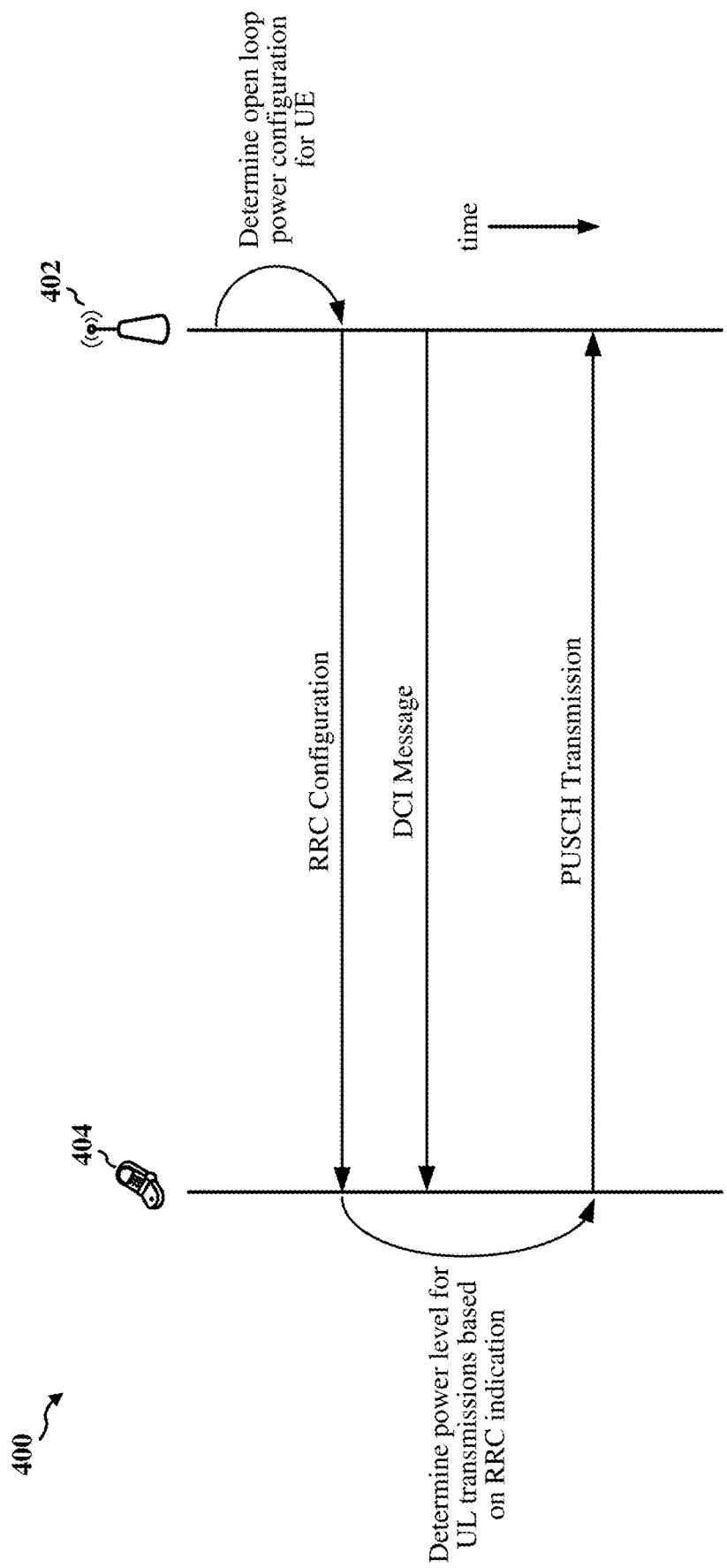
FIG. 4 shows a sequence diagram illustrating an example message exchange between a base station and a UE according to some implementations.

FIG. 4 shows a sequence diagram illustrating an example message exchange 400 between a base station 402 and a UE 404 according to some implementations. In some implementations, the base station 402 may be one example of the base station 102 of FIG. 1, the UE 404 may be one example of the UE 104 of FIG. 1, and the access network may be a 5G NR access network. The base station 402 may be any suitable base station or node including, for example, a gNB or an eNB. Although not shown, for simplicity, the base station 402 may include a multitude of antennas that can be configured to wirelessly transmit or receive information on a plurality of different beams, for example, to facilitate MIMO communications and beamforming.

The base station 402 determines an open loop power configuration for the UE 404. In some implementations, the open loop power configuration may include at least an open-loop power level (or base power level) associated with eMBB services ($P_0^{EMBB}$), a base open-loop power level associated with URLLC services ($P_0^{URLLC}$), and a boosted open-loop power level associated with URLLC services ($P_0^{URLLC,boost}$). In some aspects, the base station 402 may determine the open loop power configuration for the UE 404 based at least in part on one or more services (such as eMBB or URLLC) supported by the UE 404. In some other aspects, the base station 402 may determine the open loop power configuration for the UE 404 based at least in part on one or more services associated with other UEs in communication with the base station 402.

In some implementations, the base station 402 may signal the open loop power configuration to the UE 404 via an RRC configuration message. In some aspects, the open-loop power level associated with eMBB services $P_0^{EMBB}$ may be configured in an existing RRC parameter (such as p0-AlphaSets, as defined by Rel-15 of the 3GPP standards). In some other aspects, the open-loop power levels associated with URLLC $P_0^{URLLC}$ and $P_0^{URLLC,boost}$ may be configured in a new RRC parameter (such as P0-PUSCH-Set). For example, the base open-loop power level associated with URLLC services ($P_0^{URLLC}$) services may be indicated by a first value of the P0-PUSCH-Set parameter and the boosted open-loop power level associated with URLLC services ($P_0^{URLLC,boost}$) may be indicated by a second value of the P0-PUSCH-Set parameter.

In some aspects, the base station 402 may also transmit one or more Downlink Control Information (DCI) messages to the UE 404. The DCI messages may contain a number of parameters, configurations, schedules, and/or characteristics of one or more DL/UL channels or beams upon which the base station 402 can transmit DL/UL data and control information to the UE 404. The DCI messages may also activate and release one or more SPS configurations and/or one or more CG configurations.

The UE 404 may receive the RRC and DCI messages from the base station 402 and determine a power level for UL transmissions based, at least in part, on the open-loop power configuration provided in the RRC message. For example, the UE 404 may analyze the p0-AlphaSets or P0-PUSCH-Set parameters to determine the open-loop power level associated with eMBB services $P_0^{EMBB}$, the base open-loop base power level associated with URLLC services $P_0^{URLLC}$, and the boosted open-loop boosted power level associated with URLLC services $P_0^{URLLC,boost}$. The UE 404 may calculate the total transmit power for uplink transmissions ($P_{PUSCH}$) by applying one of the open-loop power levels to Equation 1. The UE 404 may then initiate UL transmissions to the base station 402 (via a PUSCH) using the calculated transmit power.

Figure 5:
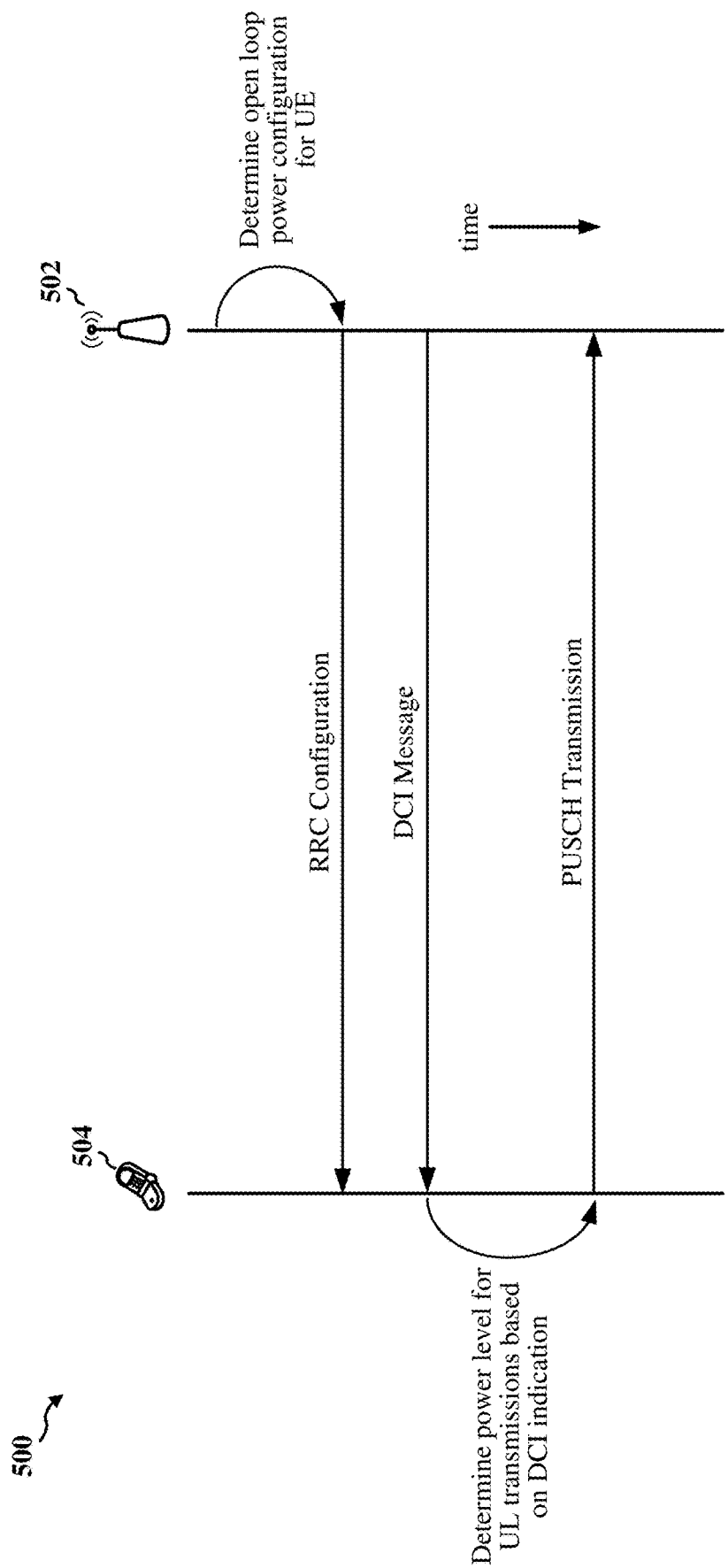
FIG. 5 shows a sequence diagram illustrating another example message exchange between a base station and a UE according to some implementations.

FIG. 5 shows a sequence diagram illustrating an example message exchange 500 between a base station 502 and a UE 504 according to some implementations. In some implementations, the base station 502 may be one example of the base station 102 of FIG. 1, the UE 504 may be one example of the UE 104 of FIG. 1, and the access network may be a 5G NR access network. The base station 502 may be any suitable base station or node including, for example, a gNB or an eNB. Although not shown, for simplicity, the base station 502 may include a multitude of antennas that can be configured to wirelessly transmit or receive information on a plurality of different beams, for example, to facilitate MIMO communications and beamforming.

The base station 502 determines an open loop power configuration for the UE 504. In some implementations, the open loop power configuration may indicate a selection of an open-loop power level (or base power level) associated with eMBB services ($P_0^{EMBB}$), a base open-loop power level associated with URLLC services ($P_0^{URLLC}$), or a boosted open-loop power level associated with URLLC services ($P_0^{,boost}$). In some aspects, the base station 502 may determine the open loop power configuration for the UE 504 based at least in part on a service (such as eMBB or URLLC) associated with UL transmissions by the UE 504 on a set of time-frequency resources (such as a PUSCH). In some other aspects, the base station 502 may determine the open loop power configuration for the UE 504 based at least in part on whether other UEs are configured to share the set of time-frequency resources with the UE 504.

In some implementations, the base station 502 may signal the open loop power configuration to the UE 504 via one or more DCI messages. In some aspects, the DCI format (such as DCI 0_1 or DCI 0_2) may include at least a priority field or an open-loop power control (OLPC) field. The open loop power configuration may be signaled by a combination of bits in the priority field or the OLPC field. For example, the priority field may be a 1-bit field indicating whether the PUSCH transmission scheduled by the DCI message is associated with low priority or high priority. In some implementations, a low-priority indication in the priority field may be associated with eMBB open-loop power levels $P_0^{EMBB}$ and a high-priority indication in the priority field may be associated with URLLC open-loop power levels $P_0^{URLLC}$ and $P_0^{URLLC,boost}$. The OLPC field may be a 1-bit field that can be used to further distinguish between the base open-loop power level $P_0^{URLLC}$ and the boosted open-loop power level $P_0^{URLLC,boost}$ associated with URLLC services. However, the open-loop power level (or base power level) associated with eMBB services may be signaled by a low-priority indication in the priority field regardless of the OLPC field. Example bit combinations associated with the various open loop power levels is summarized in Table 1.

TABLE 1

|  | Priority = Low | Priority = High |
| --- | --- | --- |
| OLPC = 0 | $P_0^{EMBB}$ | $P_0^{URLLC}$ |
| OLPC = 1 | $P_0^{EMBB}$ | $P_0^{URLLC,\ boost}$ |

The base station 502 may also transmit an RRC configuration message to the UE 504. The RRC configuration message may facilitate connection establishment and release functions, broadcast of system information, radio bearer establishment, reconfiguration and release operations, RRC connection mobility procedures, paging notification, and power control. The RRC may also configure user and control planes, define multiple downlink semi-persistent scheduling (SPS) configurations, define multiple uplink configured grant (CG) configurations, and control various other functions of the access network.

The UE 504 may receive the RRC and DCI messages from the base station 502 and determine a power level for UL transmissions based, at least in part, on the open loop power level indication provided in the RRC configuration. For example, the UE 504 may analyze the combination of bits in the priority or OLPC fields of the received DCI message to determine whether to use the open-loop power level associated with eMBB services $P_0^{EMBB}$, the base open-loop power level associated with URLLC services $P_0^{URLLC}$, or the boosted open-loop power level associated with URLLC services $P_0^{URLLC,boost}$. The UE 504 may calculate the total transmit power for uplink transmissions ($P_{PUSCH}$) by applying the determined open-loop power level to Equation 1. The UE 504 may then initiate UL transmissions to the base station 502 on the scheduled time-frequency resources (or PUSCH) using the calculated transmit power.

In some implementations, where the priority field is not configured in the DCI message, the UE 504 may determine the priority of PUSCH transmission scheduled by the DCI message based on the priority of the DCI format. For example, RRC signaling may indicate that the DCI format 0_1 is associated with a low priority whereas the DCI format 0_2 is associated with a high priority. In some instances, where both DCI format 0_1 and DCI format 0_2 are configured to the UE 504, (UE 504 is configured to monitor both DCI format 0_1 and DCI format 0_2), the OLPC field may only be configured in DCI format 0_2 (and not DCI format 0_1), since DCI format 0_1 is associated with a low priority channel. Accordingly, the UE may determine the open loop power control parameter based on the priority of the DCI format (in lieu of the priority of the PUSCH) and the bit value of the OLPC field (such as described with respect to Table 1). In some other implementations, where the OLPC field is not configured in the DCI, the UE may simply use the open loop power level associated with eMBB services $P_0^{EMBB}$ as its open-loop power level.

Figure 6:
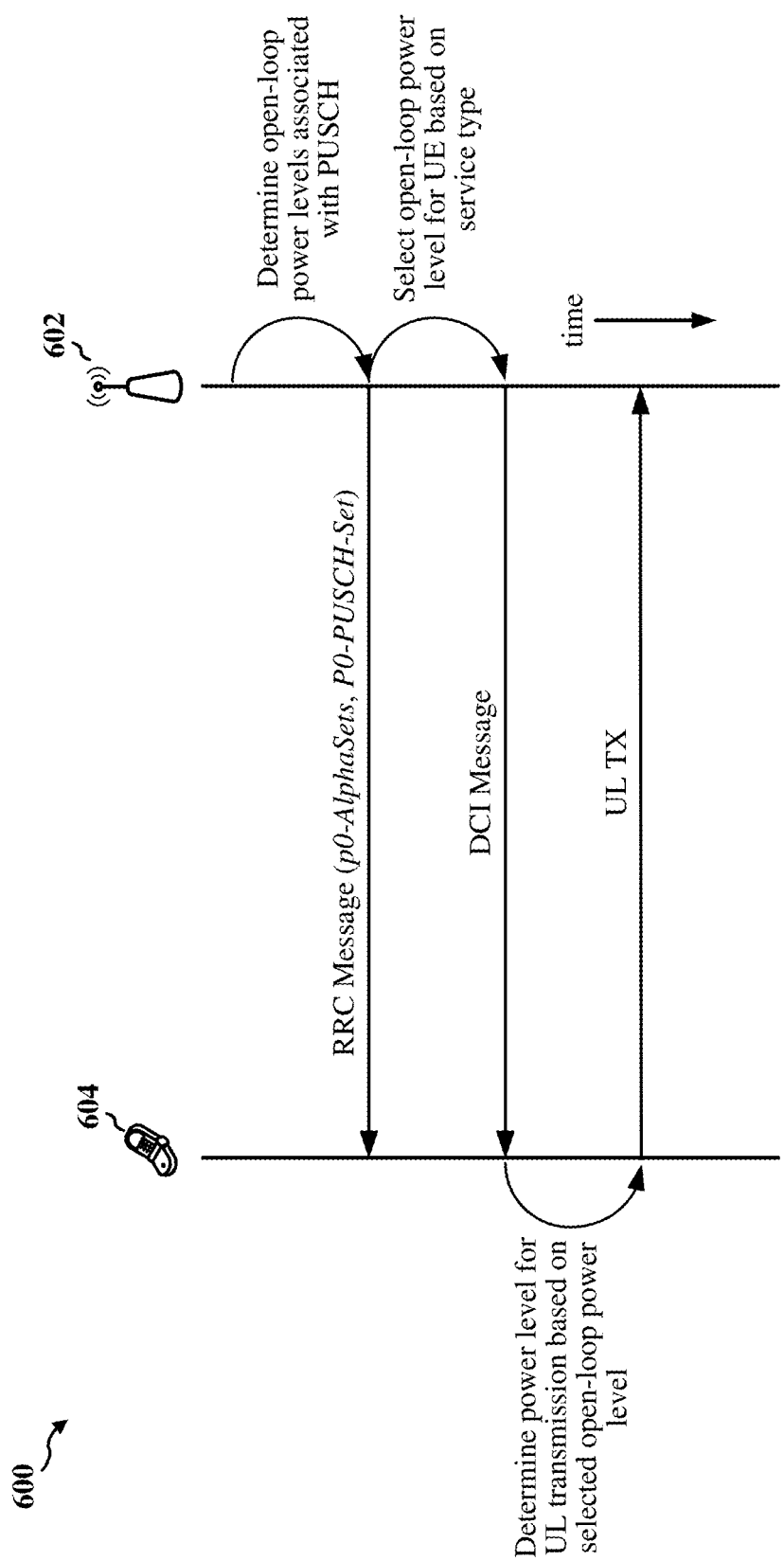
FIG. 6 shows a sequence diagram illustrating an example message exchange between a base station and a UE according to some implementations.

FIG. 6 shows a sequence diagram illustrating an example message exchange 600 between a base station 602 and a UE 604 according to some implementations. In some implementations, the base station 602 may be one example of the base station 102 of FIG. 1, the UE 604 may be one example of the UE 104 of FIG. 1, and the access network may be a 5G NR access network. The base station 602 may be any suitable base station or node including, for example, a gNB or an eNB. Although not shown, for simplicity, the base station 602 may include a multitude of antennas that can be configured to wirelessly transmit or receive information on a plurality of different beams, for example, to facilitate MIMO communications and beamforming.

The base station 602 determines a number of open-loop power levels to be used for uplink transmissions on a particular wireless channel (such as a PUSCH). In some implementations, the open-loop power levels may include at least an open-loop power level (or base power level) associated with eMBB services ($P_0^{EMBB}$), a base open-loop power level associated with URLLC services ($P_0^{URLLC}$), and a boosted open-loop power level associated with URLLC services ($P_0^{URLLC,boost}$). In some aspects, the base station 602 may determine the open-loop power levels based at least in part on one or more services (such as eMBB or URLLC) supported by the UE 604. In some other aspects, the base station 602 may determine the open-loop power levels based at least in part on one or more services associated with other UEs in communication with the base station 602.

In some implementations, the base station 602 may indicate the open-loop power levels to the UE 604 by transmitting an RRC configuration message including a p0-Alpha-Sets parameter and a P0-PUSCH-Set parameter. For example, the open-loop power level associated with eMBB services $P_0^{EMBB}$ may be indicated by a value of the p0-AlphaSets, the base open-loop power level associated with URLLC services ($P_0^{URLLC}$) may be indicated by a first value of the P0-PUSCH-Set parameter, and the boosted open-loop power level associated with URLLC services ($P_0^{URLLC,boost}$) may be indicated by a second value of the P0-PUSCH-Set parameter.

The base station 602 may further select one of the open-loop power levels $P_0^{EMBB}$, $P_0^{URLLC}$, or $P_0^{URLLC,boost}$ to be used for an uplink transmission (UL TX) by the UE 604 on the associated wireless channel. In some implementations, the base station 602 may select the open-loop power level based on the service associated with the UL transmission. For example, the base station 602 may select the open-loop power level associated with eMBB services if the UL TX is associated with the eMBB service. On the other hand, the base station 602 may select one of the open-loop power levels associated with URLLC services if the UL TX is associated with the URLLC service.

In some other implementations, the base station 602 may select the open-loop power level based on whether uplink transmissions by other UEs are scheduled to be multiplexed (or transmitted concurrently) with the UL TX by the UE 604 on the same wireless channel. For example, the base station 602 may select the base open-loop power level associated with URLLC services if no other uplink transmissions are scheduled to be multiplexed with the UL TX. On the other hand, the base station 602 may select the boosted open-loop power level associated with URLLC services if an uplink transmission (associated with eMBB services) from at least one other UE is scheduled to be multiplexed with the UL TX.

In some implementations, the base station 602 may indicate the selected open-loop power level to the UE 604 by transmitting a DCI message including at least a priority field or an OLPC field. More specifically, the selected open-loop power level may be indicated by a combination of bits (such as at least 2 bits) in the priority field or the OLPC field of the DCI message. For example, a first bit pattern may represent the open-loop power level associated with eMBB services ($P_0^{EMBB}$), a second bit pattern may represent the base open-loop power level associated with URLLC services ($P_0^{URLLC}$), and a third bit pattern may represent the boosted open-loop power level associated with URLLC services ($P_0^{URLLC,boost}$).

The UE 604 may receive the RRC and DCI messages from the base station 602 and determine a power level for the UL TX based on the information in the received RRC and DCI messages. For example, the UE 604 may determine the selected open-loop power level (such as $P_0^{EMBB}$, $P_0^{URLLC}$, or $P_0^{URLLC,boost}$) based on the information carried in the priority field or the OLPC field of the received DCI message. The UE 604 may further determine the value of the selected open-loop power level $P_0^{EMBB}$, $P_0^{URLLC}$, or $P_0^{URLLC,boost}$ based on a value of the p0-AlphaSets or the P0 PUSCH-Set parameter in the received RRC message. The UE 604 may calculate the total transmit power for the UL TX ($P_{PUSCH}$) by applying the value of the selected open-loop power level to Equation 1. The UE 604 may then perform the UL TX, on the wireless channel (or PUSCH), using the calculated transmit power.

Figure 7:
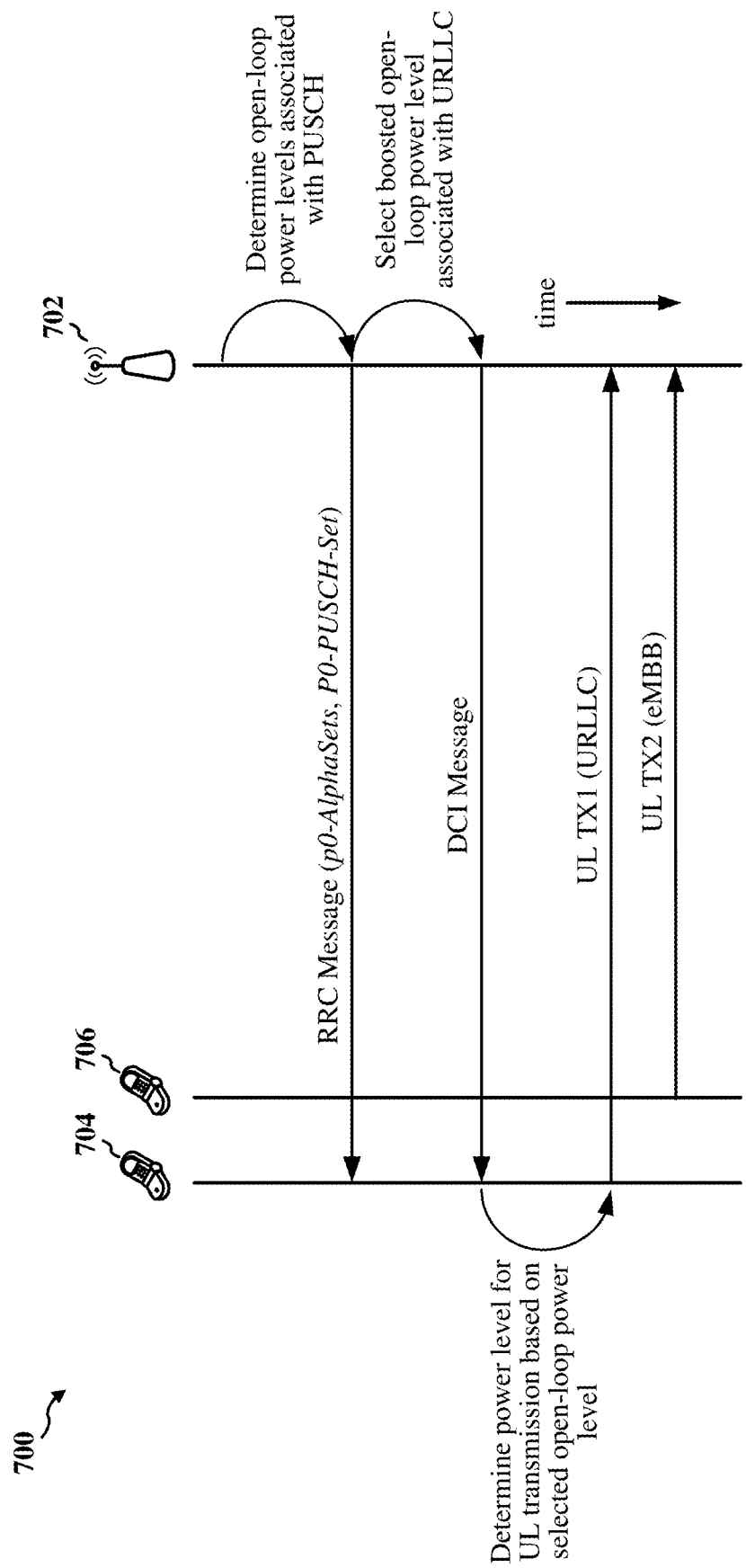
FIG. 7 shows a sequence diagram illustrating another example message exchange between a base station and multiple UEs according to some implementations.

FIG. 7 shows a sequence diagram illustrating an example message exchange 700 between a base station 702 and multiple UEs 704 and 706 according to some implementations. In some implementations, the base station 702 may be one example of the base station 102 of FIG. 1, the UEs 704 and 706 may be examples of the UE 104 of FIG. 1, and the access network may be a 5G NR access network. The base station 702 may be any suitable base station or node including, for example, a gNB or an eNB. Although not shown, for simplicity, the base station 702 may include a multitude of antennas that can be configured to wirelessly transmit or receive information on a plurality of different beams, for example, to facilitate MIMO communications and beamforming.

The base station 702 determines a number of open-loop power levels to be used for uplink transmissions on a particular wireless channel (such as a PUSCH). In some implementations, the open-loop power levels may include at least an open-loop power level (or base power level) associated with eMBB services ($P_0^{EMBB}$), a base open-loop power level associated with URLLC services ($P_0^{URLLC}$), and a boosted open-loop power level associated with URLLC services ($P_0^{URLLC,boost}$). In some aspects, the base station 702 may determine the open-loop power levels based at least in part on one or more services (such as eMBB or URLLC) supported by the first UE 704 or the second UE 706.

In some implementations, the base station 702 may indicate the open-loop power levels to the first UE 704 by transmitting an RRC configuration message including a p0-AlphaSets parameter and a P0-PUSCH-Set parameter. For example, the open-loop power level associated with eMBB services $P_0^{EMBB}$ may be indicated by a value of the p0-AlphaSets, the base open-loop power level associated with URLLC services ($P_0^{URLLC}$) may be indicated by a first value of the P0-PUSCH-Set parameter, and the boosted open-loop power level associated with URLLC services ($P_0^{URLLC,boost}$) may be indicated by a second value of the P0-PUSCH-Set parameter.

The base station 702 may further select one of the open-loop power levels $P_0^{EMBB}$, $P_0^{URLLC}$, or $P_0^{URLLC,boost}$ to be used for an uplink transmission (UL TX1) by the first UE 704 on the associated wireless channel. In some implementations, the base station 702 may select the open-loop power level based on the service associated with UL TX1. In some other implementations, the base station 702 may select the open-loop power level based on whether an uplink transmission (UL TX2) by the second UE 706 is scheduled to be multiplexed (or transmitted concurrently) with UL TX1 on the same wireless channel.

In the example of FIG. 7, UL TX1 is associated with a URLLC service and UL TX2 is associated with an eMBB service. In some implementations, UL TX1 and UL TX2 may be scheduled to be transmitted at different times or on different wireless channels. In such implementations, the base station 702 may select the base open-loop power level associated with URLLC services ($P_0^{URLLC}$) for the first UE 704. In some other implementations, UL TX1 and UL TX2 may be scheduled to be transmitted concurrently on the same (or overlapping) wireless channel. In such implementations, the base station may select the boosted open-loop power level associated with URLLC services ($P_0^{URLLC,boost}$) for the first UE 704.

In some implementations, the base station 702 may indicate the selected open-loop power level to the UE 704 by transmitting a DCI message including at least a priority field or an OLPC field. The selected open-loop power level may be indicated by a combination of bits in the priority field or the OLPC field of the DCI message. For example, the DCI message may include a first bit pattern representing the base open-loop power level associated with URLLC services or a second bit pattern representing the boosted open-loop power level associated with URLLC services based on whether UL TX1 and UL TX2 are multiplexed on the same wireless channel.

The first UE 704 may receive the RRC and DCI messages from the base station 702 and determine a power level for UL TX1 based on the information in the received RRC and DCI messages. For example, the first UE 704 may determine the selected open-loop power level (such as $P_0^{URLLC}$ or $P_0^{URLLC,boost}$) based on the information carried in the priority field or the OLPC field of the received DCI message. The first UE 704 may further determine the value of the selected open-loop power level $P_0^{URLLC}$, or $P_0^{URLLC,boost}$ based on a value of the P0-PUSCH-Set parameter in the received RRC message. The first UE 704 may calculate the total transmit power for UL TX1 ($P_{PUSCH}$) by applying the value of the selected open-loop power level to Equation 1. The first UE 704 may then perform UL TX1, on the associated wireless channel (or PUSCH), using the calculated transmit power.

In some implementations, the base station 702 also may transmit an RRC message indicating the open-loop power levels $P_0^{EMBB}$, $P_0^{URLLC}$, and $P_0^{URLLC,boost}$ to the second UE 706. The base station 702 may further transmit a DCI message indicating a selection of the open-loop power level associated with eMBB services ($P_0^{EMBB}$). The second UE 706 may receive the RRC and DCI messages from the base station 702 and determine a power level for UL TX2 based on the information in the received RRC and DCI messages. For example, the second UE 706 may determine the selected open-loop power level $P_0^{EMBB}$ based on the information carried in the priority field or the OLPC field of the received DCI message. The second UE 706 may further determine the value of the selected open-loop power level $P_0^{EMBB}$ based on a value of the p0-AlphaSets parameter in the received RRC message. The second UE 706 may calculate the total transmit power for UL TX2 (in accordance with Equation 1) and perform UL TX2, on the associated wireless channel (or PUSCH), using the calculated transmit power FIG. 8A shows a flowchart illustrating an example process 800 for wireless communication that supports power control indication for multiple services according to some implementations. In some implementations, the process 800 may be performed by a wireless communication device operating as or within a network node, such as one of the base stations 102 or 310 described above with reference to FIGS. 1 and 3, respectively.

In some implementations, the process 800 begins in block 802 with transmitting, to a first wireless device, scheduling information indicating first, second, and third open-loop power levels associated with uplink transmissions on a first wireless channel. In some implementations, the scheduling information is transmitted in an RRC message carrying a p0-AlphaSets parameter and a P0-PUSCH-Set parameter. In some implementations, the first open-loop power level is indicated by a value of the p0-AlphaSets parameter, the second open-loop power level is indicated by a first value of the P0-PUSCH-Set parameter, and the third open-loop power level is indicated by a second value of the P0-PUSCH-Set parameter.

In block 804, the process 800 proceeds with selecting one of the first, second, or third open-loop power levels to be used for a first uplink transmission by the first wireless device based at least in part on a type of service associated with the first uplink transmission. For example, the selected open-loop power level may represent a power of the first uplink transmission received by the wireless communication device. In some implementations, the type of service may include an eMBB service type or a URLLC service type. In some implementations, the first open-loop power level may be associated with the eMBB service type, the second open-loop power level may be a base open-loop power level associated with the URLLC service type, and the third open-loop power level may be a boosted open-loop power level associated with the URLLC service type. In some implementations, the second open-loop power level may be higher than the first open-loop power level, and the third open-loop power level may be higher than the second open-loop power level.

In block 806, the process 800 proceeds with transmitting, to the first wireless device, open-loop power control information indicating the selected open-loop power level. In some implementations, the open loop power control information may be transmitted in a DCI message including at least one of a priority field or an open loop power control field. In some implementations, the open loop power control information may be indicated by a combination of bits in the priority field or the open loop power control field. In block 808, the process 800 proceeds with receiving the first uplink transmission on the first wireless channel based on the selected open-loop power level.

Figure 8B:
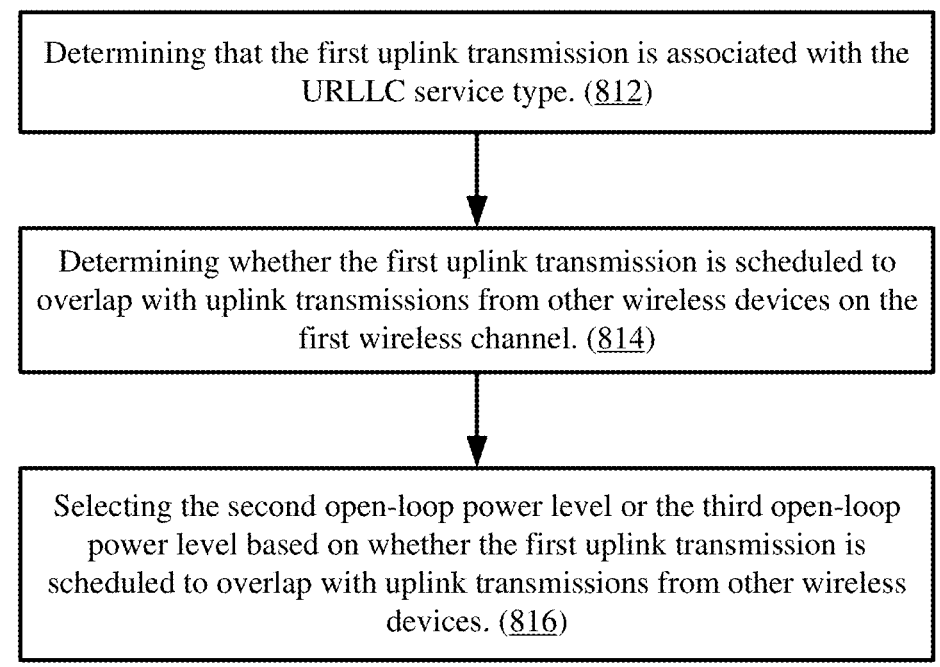
FIG. 8B shows a flowchart illustrating an example process for wireless communication that supports power control indication for multiple services according to some implementations.

FIG. 8B shows a flowchart illustrating an example process 810 for wireless communication that supports power control indication for multiple services according to some implementations. In some implementations, the process 810 may be performed by a wireless communication device operating as or within a network node, such as one of the base stations 102 or 310 described above with reference to FIGS. 1 and 3, respectively.

With reference for example to FIG. 8A, the process 810 may be a more detailed implementation of the open-loop power level selection operation described in block 804 of the process 800. For example, the process 810 may begin, in block 812, after the transmission of the scheduling information to the first wireless device in block 802, and before the transmission of the open loop power control information to the first wireless device in block 806.

In block 812, the process 810 proceeds with determining that the first uplink transmission is associated with the URLLC service type. In block 814, the process 810 proceeds with determining whether the first uplink transmission is scheduled to overlap with uplink transmissions from other wireless devices on the first wireless channel. In block 816, the process 810 proceeds with selecting the second open-loop power level or the third open-loop power level based on whether the first uplink transmission is scheduled to overlap with uplink transmissions from other wireless devices.

In some aspects, the second open-loop power level may be selected responsive to determining that no uplink transmissions by other wireless devices are scheduled to overlap with the first uplink transmission. In some other aspects, the third open-loop power level may be selected responsive to determining that a second uplink transmission by a second wireless device is scheduled to overlap with the first uplink transmission. In some implementations, the second uplink transmission may be associated with the eMBB service type.

Figure 9:
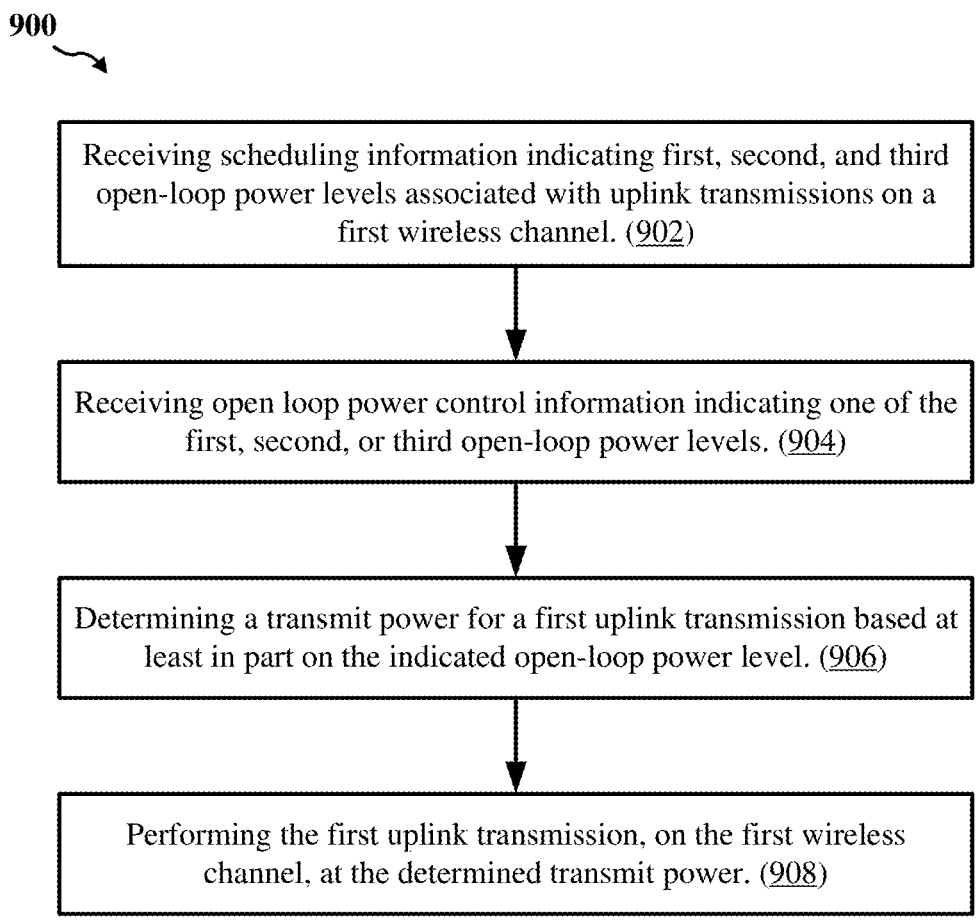
FIG. 9 shows a flowchart illustrating an example process for wireless communication that supports power control indication for multiple services according to some implementations.

FIG. 9 shows a flowchart illustrating an example process 900 for wireless communication that supports power control indication for multiple services according to some implementations. In some implementations, the process 900 may be performed by a wireless communication device operating as or within a network node, such as one of the base stations 102 or 310 described above with reference to FIGS. 1 and 3, respectively.

In some implementations, the process 900 begins in block 902 with receiving scheduling information indicating first, second, and third open-loop power levels associated with uplink transmissions on a first wireless channel. In some implementations, the scheduling information is received in an RRC message carrying a p0-AlphaSets parameter and a P0-PUSCH-Set parameter. In some implementations, the first open-loop power level is indicated by a value of the p0-AlphaSets parameter, the second open-loop power level is indicated by a first value of the P0-PUSCH-Set parameter, and the third open-loop power level is indicated by a second value of the P0-PUSCH-Set parameter.

In block 904, the process 900 proceeds with receiving open loop power control information indicating one of the first, second, or third open-loop power levels. In some implementations, the open loop power control information may be received in a DCI message including at least one of a priority field or an open loop power control field. In some implementations, the open loop power control information may be indicated by a combination of bits in the priority field or the open loop power control field.

In block 906, the process 900 proceeds with determining a transmit power for a first uplink transmission based at least in part on the indicated open-loop power level. In block 908, the process 900 proceeds with performing the first uplink transmission, on the first wireless channel, at the determined transmit power. In some implementations, the first open-loop power level may be associated with an eMBB service type, the second open-loop power level may be a base open-loop power level associated with a URLLC service type, and the third open-loop power level is a boosted open-loop power level associated with the URLLC service type. In some implementations, the second open-loop power level may be higher than the first open-loop power level, and the third open-loop power level may be higher than the second open-loop power level.

Figure 10:
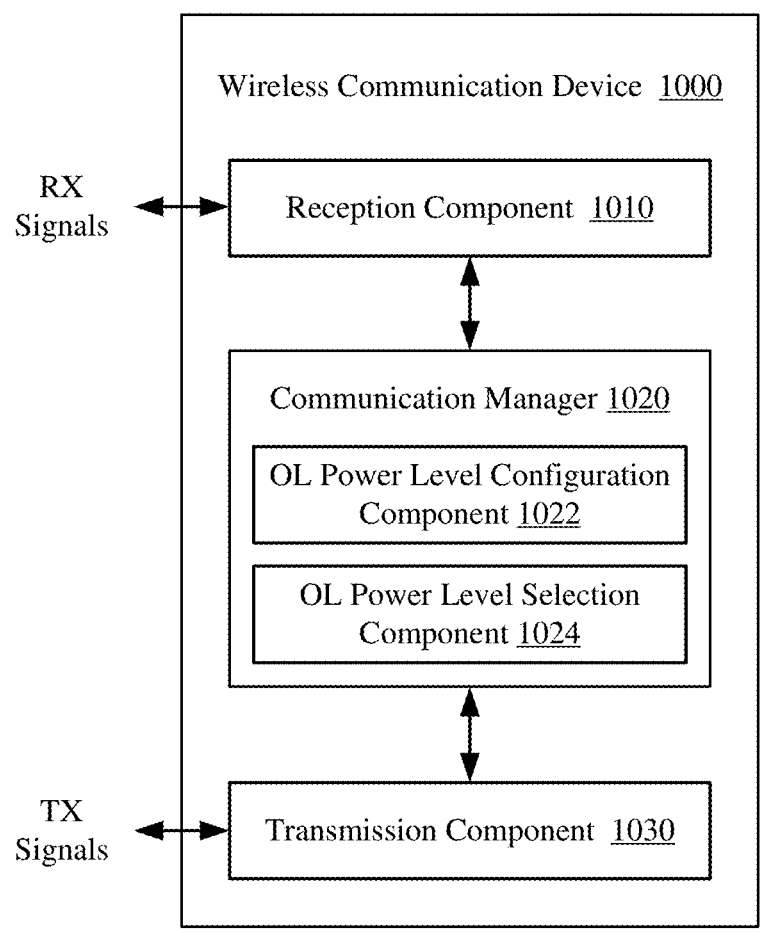
FIG. 10 shows a block diagram of an example wireless communication device according to some implementations.

FIG. 10 shows a block diagram of an example wireless communication device 1000 according to some implementations. In some implementations, the wireless communication device 1000 is configured to perform any of the processes 800 or 810 described above with reference to FIGS. 8A and 8B, respectively. The wireless communication device 1000 can be an example implementation of any of the base stations 102 or 310 described above with reference to FIGS. 1 and 3, respectively. For example, the wireless communication device 1000 can be a chip, SoC, chipset, package or device that includes at least one processor and at least one modem (for example, a Wi-Fi (IEEE 802.11) modem or a cellular modem).

The wireless communication device 1000 includes a reception component 1010, a communication manager 1020, and a transmission component 1030. The communication manager 1020 further includes an open-loop (OL) power level configuration component 1022 and an OL power level selection component 1024. Portions of one or more of the components 1022 and 1024 may be implemented at least in part in hardware or firmware. In some implementations, at least some of the components 1022 or 1024 are implemented at least in part as software stored in a memory (such as the memory 376). For example, portions of one or more of the components 1022 and 1024 can be implemented as non-transitory instructions (or "code") executable by a processor (such as the controller/processor 375) to perform the functions or operations of the respective component.

The reception component 1010 is configured to receive RX signals representing UL transmissions from other wireless devices. The transmission component 1030 is configured to transmit TX signals representing DL transmissions to other wireless devices. In some implementations, the TX signals may carry scheduling information indicating first, second, and third open-loop power levels associated with uplink transmissions on a first wireless channel. The communication manager 1020 is configured to manage communications between the wireless communication device 1000 and one or more other wireless devices. In some implementations, the OL power level configuration component 1022 may determine the first, second, and third open-loop power levels; and the OL power level selection component 1024 may select one of the first, second, or third open-loop power levels to be used for a first uplink transmission by a first wireless device based at least in part on a type of service associated with the first uplink transmission. In some implementations, the selected open-loop power level may be indicated in TX signals transmitted to the first wireless device.

Figure 11:
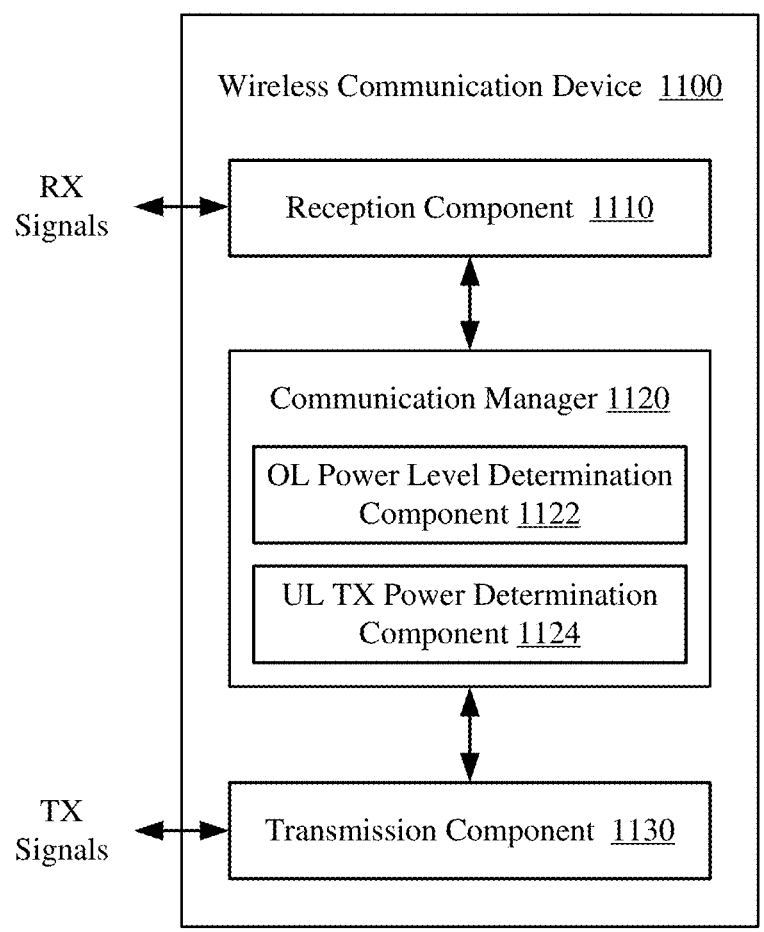
FIG. 11 shows a block diagram of an example wireless communication device according to some implementations.

FIG. 11 shows a block diagram of an example wireless communication device 1100 according to some implementations. In some implementations, the wireless communication device 1100 is configured to perform the processes 900 described above with reference to FIG. 9. The wireless communication device 1100 can be an example implementation of any of the UEs 104 or 350 described above with reference to FIGS. 1 and 3, respectively. For example, the wireless communication device 1100 can be a chip, SoC, chipset, package or device that includes at least one processor and at least one modem (for example, a Wi-Fi (IEEE 802.11) modem or a cellular modem).

The wireless communication device 1100 includes a reception component 1110, a communication manager 1120, and a transmission component 1130. The communication manager 1120 further includes an open-loop (OL) power level determination component 1122 and an uplink (UL) transmit (TX) power determination component 1124. Portions of one or more of the components 1122 and 1124 may be implemented at least in part in hardware or firmware. In some implementations, at least some of the components 1122 or 1124 are implemented at least in part as software stored in a memory (such as the memory 360). For example, portions of one or more of the components 1122 and 1124 can be implemented as non-transitory instructions (or "code") executable by a processor (such as the controller/processor 359) to perform the functions or operations of the respective component.

The reception component 1110 is configured to receive RX signals representing DL transmissions from a base station. In some implementations, the RX signals may carry scheduling information indicating first, second, and third open-loop power levels associated with uplink transmissions on a first wireless channel. In some other implementations, the RX signals may carry open loop power control information indicating one of the first, second, or third open-loop power levels. The transmission component 1130 is configured to transmit TX signals representing UL transmissions to the base station. The communication manager 1120 is configured to manage communications between the wireless communication device 1100 and the base station. In some implementations, the OL power level determination component 1122 may determine an open-loop power level associated with a first uplink transmission based on the scheduling information and the open loop power control information in the received RRC and DCI messages, respectively; and the UL TX power determination component 1124 may determine a transmit power for the first uplink transmission based at least in part on the determined open-loop power level. In some implementations, the TX signals, including the first uplink transmission, may be transmitted at the determined transmit power.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication performed by a wireless communication device, comprising:
    transmitting, to a first wireless device, scheduling information indicating first, second, and third open-loop power levels associated with uplink transmissions on a first wireless channel, wherein the scheduling information is transmitted in one or more of a radio resource control (RRC) message carrying a p0-AlphaSets parameter and a P0-PUSCH-Set parameter or a downlink control information (DCI) message including an open loop power control field,
        wherein the first open-loop power level is indicated by a value of the p0-AlphaSets parameter, the second open-loop power level is indicated by a first value of the P0-PUSCH-Set parameter, and the third open-loop power level is indicated by a second value of the P0-PUSCH-Set parameter;
    selecting one of the first, second, or third open-loop power levels as a selected open-loop power level that is to be used for a first uplink transmission by the first wireless device;
    transmitting, to the first wireless device, open-loop power control information indicating the selected open-loop power level, wherein the selected open-loop power level is indicated by a combination of bits in the open loop power control field; and
    receiving the first uplink transmission on the first wireless channel based on the selected open-loop power level.

2. The method of claim 1, wherein the selected open-loop power level represents a power of the first uplink transmission to be received by the wireless communication device.

3. The method of claim 1, wherein the first wireless channel comprises a physical uplink shared channel (PUSCH).

4. The method of claim 1, wherein the first uplink transmission is associated with a type of service, and wherein the type of service comprises an enhanced mobile broadband (eMBB) service type or an ultra-reliable low-latency communication (URLLC) service type.

5. The method of claim 4, wherein the first open-loop power level is associated with the eMBB service type, the second open-loop power level is a base open-loop power level associated with the URLLC service type, and the third open-loop power level is a boosted open-loop power level associated with the URLLC service type.

6. The method of claim 5, wherein the second open-loop power level is higher than the first open-loop power level, and the third open-loop power level is higher than the second open-loop power level.

7. The method of claim 6, wherein the selecting of one of the first, second, or third open-loop power levels comprises:
    determining that the first uplink transmission is associated with the URLLC service type;
    determining whether the first uplink transmission is scheduled to overlap with uplink transmissions from other wireless devices on the first wireless channel; and
    selecting the second open-loop power level or the third open-loop power level based on whether the first uplink transmission is scheduled to overlap with uplink transmissions from other wireless devices.

8. The method of claim 7, wherein the second open-loop power level is selected responsive to determining that no uplink transmissions by other wireless devices are scheduled to overlap with the first uplink transmission.

9. The method of claim 7, wherein the third open-loop power level is selected responsive to determining that a second uplink transmission by a second wireless device is scheduled to overlap with the first uplink transmission.

10. The method of claim 9, wherein the second uplink transmission is associated with the eMBB service type.

11. The method of claim 1, wherein the first open-loop power level is indicated by a value of the p0-AlphaSets parameter, the second open-loop power level is indicated by a first value of the P0-PUSCH-Set parameter, and the third open-loop power level is indicated by a second value of the P0-PUSCH-Set parameter.

12. The method of claim 1, wherein the DCI message further includes a priority field.

13. The method of claim 12, wherein the open loop power control information is indicated by a combination of bits in the priority field.

14. The method of claim 1, wherein the open loop power control field indicates a selection of the first open-loop power level, the second open-loop power level, or the third open-loop power level.

15. The method of claim 1, wherein the combination of bits in the open loop power control field comprises a first bit pattern to indicate a selection of the first open-loop power level, a second bit pattern to indicate the second open-loop power level, or a third bit pattern to indicate the third open-loop power level.

16. A wireless communication device comprising:
    one or more processors; and a memory coupled to the one or more processors and including instructions that, when executed by the one or more processors, cause the wireless communication device to:
    transmit, to a first wireless device, scheduling information indicating first, second, and third open-loop power levels associated with uplink transmissions on a first wireless channel, wherein the scheduling information is transmitted in one or more of a radio resource control (RRC) message carrying a p0-AlphaSets parameter and a P0-PUSCH-Set parameter or a downlink control information (DCI) message including an open loop power control field,
        wherein the first open-loop power level is indicated by a value of the p0-AlphaSets parameter, the second open-loop power level is indicated by a first value of the P0-PUSCH-Set parameter, and the third open-loop power level is indicated by a second value of the P0-PUSCH-Set parameter;
    select one of the first, second, or third open-loop power levels as a selected open-loop power level that is to be used for a first uplink transmission by the first wireless device;
    transmit, to the first wireless device, open-loop power control information indicating the selected open-loop power level, wherein the selected open-loop power level is indicated by a combination of bits in the open loop power control field; and
    receive the first uplink transmission on the first wireless channel based on the selected open-loop power level.

17. The wireless communication device of claim 16, wherein the selected open-loop power level represents a power of the first uplink transmission to be received by the wireless communication device.

18. The wireless communication device of claim 16, wherein the first wireless channel comprises a physical uplink shared channel (PUSCH).

19. The wireless communication device of claim 16, wherein the first uplink transmission is associated with a type of service, and wherein the type of service comprises an enhanced mobile broadband (eMBB) service type or an ultra-reliable low-latency communication (URLLC) service type.

20. The wireless communication device of claim 19, wherein the first open-loop power level is associated with the eMBB service type, the second open-loop power level is a base open-loop power level associated with the URLLC service type, and the third open-loop power level is a boosted open-loop power level associated with the URLLC service type.

21. The wireless communication device of claim 20, wherein the second open-loop power level is higher than the first open-loop power level, and the third open-loop power level is higher than the second open-loop power level.

22. The wireless communication device of claim 21, wherein execution of the instructions for selecting one of the first, second, or third open-loop power levels causes the wireless communication device to:
    determine that the first uplink transmission is associated with the URLLC service type;
    determine whether the first uplink transmission is scheduled to overlap with uplink transmissions from other wireless devices on the first wireless channel; and
    select the second open-loop power level or the third open-loop power level based on whether the first uplink transmission is scheduled to overlap with uplink transmissions from other wireless devices.

23. The wireless communication device of claim 22, wherein the second open-loop power level is selected responsive to determining that no uplink transmissions by other wireless devices are scheduled to overlap with the first uplink transmission.

24. The wireless communication device of claim 22, wherein the third open-loop power level is selected responsive to determining that a second uplink transmission by a second wireless device is scheduled to overlap with the first uplink transmission.

25. The wireless communication device of claim 24, wherein the second uplink transmission is associated with the eMBB service type.

26. The wireless communication device of claim 24, wherein the open loop power control field indicates a selection of the first open-loop power level, the second open-loop power level, or the third open-loop power level.

27. The wireless communication device of claim 24, wherein the combination of bits in the open loop power control field comprises a first bit pattern to indicate a selection of the first open-loop power level, a second bit pattern to indicate the second open-loop power level, or a third bit pattern to indicate the third open-loop power level.

28. The wireless communication device of claim 16, wherein the DCI message further includes a priority field.

29. The wireless communication device of claim 28, wherein the open-loop power control information is indicated by a combination of bits in the priority field.

30. A method of wireless communication performed by a wireless communication device, comprising:
    receiving scheduling information indicating first, second, and third open-loop power levels associated with uplink transmissions on a first wireless channel, wherein the scheduling information is transmitted in one or more of a radio resource control (RRC) message carrying a p0-AlphaSets parameter and a P0-PUSCH-Set parameter or a downlink control information (DCI) message including an open loop power control field,
        wherein the first open-loop power level is indicated by a value of the p0-AlphaSets parameter, the second open-loop power level is indicated by a first value of the P0-PUSCH-Set parameter, and the third open-loop power level is indicated by a second value of the P0-PUSCH-Set parameter;
    receiving open loop power control information indicating one of the first, second, or third open-loop power levels, wherein the one of the first, second, or third open-loop power levels is indicated by a combination of bits in the open loop power control field;
    determining a transmit power for a first uplink transmission based at least in part on the one of the first, second, or third open-loop power levels; and
    performing the first uplink transmission, on the first wireless channel, at the determined transmit power.

31. The method of claim 30, wherein the first wireless channel comprises a physical uplink shared channel (PUSCH).

32. The method of claim 30, wherein the first open-loop power level is associated with an enhanced mobile broadband (eMBB) service type, the second open-loop power level is a base open-loop power level associated with an ultra-reliable low latency communication (URLLC) service type, and the third open-loop power level is a boosted open-loop power level associated with the URLLC service type.

33. The method of claim 32, wherein the second open-loop power level is higher than the first open-loop power level, and the third open-loop power level is higher than the second open-loop power level.

34. The method of claim 30, wherein the DCI message further includes a priority field.

35. The method of claim 34, wherein the open loop power control information is indicated by a combination of bits in the priority field.

36. The method of claim 30, wherein the open loop power control field indicates a selection of the first open-loop power level, the second open-loop power level, or the third open-loop power level.

37. The method of claim 30, wherein the combination of bits in the open loop power control field comprises a first bit pattern to indicate a selection of the first open-loop power level, a second bit pattern to indicate the second open-loop power level, or a third bit pattern to indicate the third open-loop power level.

38. A wireless communication device comprising:
one or more processors; and
a memory coupled to the one or more processors and including instructions that, when executed by the one or more processors, cause the wireless communication device to:
receive scheduling information indicating first, second, and third open-loop power levels associated with uplink transmissions on a first wireless channel, wherein the scheduling information is transmitted in one or more of a radio resource control (RRC) message carrying a p0-AlphaSets parameter and a P0-PUSCH-Set parameter or a downlink control information (DCI) message including an open loop power control field,
wherein the first open-loop power level is indicated by a value of the p0-AlphaSets parameter, the second open-loop power level is indicated by a first value of the P0-PUSCH-Set parameter, and the third open-loop power level is indicated by a second value of the P0-PUSCH-Set parameter;
receive open loop power control information indicating one of the first, second, or third open-loop power levels, wherein the one of the first, second, or third open-loop power levels is indicated by a combination of bits in the open loop power control field;
determine a transmit power for a first uplink transmission based at least in part on the one of the first, second, or third open-loop power levels; and
perform the first uplink transmission, on the first wireless channel, at the determined transmit power.

39. The wireless communication device of claim 38, wherein the first wireless channel comprises a physical uplink shared channel (PUSCH).

40. The wireless communication device of claim 38, wherein the first open-loop power level is associated with an enhanced mobile broadband (eMBB) service type, the second open-loop power level is a base open-loop power level associated with an ultra-reliable low latency communication (URLLC) service type, and the third open-loop power level is a boosted open-loop power level associated with the URLLC service type.

41. The wireless communication device of claim 40, wherein the second open-loop power level is higher than the first open-loop power level, and the third open-loop power level is higher than the second open-loop power level.

42. The wireless communication device of claim 38, wherein the DCI message further includes a priority field.

43. The wireless communication device of claim 42, wherein the open loop power control information is indicated by a combination of bits in the priority field.

44. The wireless communication device of claim 38, wherein the open loop power control field indicates a selection of the first open-loop power level, the second open-loop power level, or the third open-loop power level.

* * * * *